US012611960B2

(12) United States Patent  (10) Patent No.:  US 12,611,960 B2
Saito et al.  (45) Date of Patent:  Apr. 28, 2026

(54) ELECTRICALLY POWERED VEHICLE

(71) Applicant: TOYOTA JIDOSHA KABUSHIKI KAISHA, Toyota (JP)

(72) Inventors: Mamoru Saito, Toyota (JP); Shin Inoue, Okazaki (JP); Naoki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 243 days.

(21) Appl. No.: 18/514,557

(22) Filed: Nov. 20, 2023

(65) Prior Publication Data

US 2024/0181925 A1 Jun. 6, 2024

(30) Foreign Application Priority Data

Dec. 5, 2022 (JP) ................................. 2022-194393

(51) Int. Cl.
| | |
|---|---|
| *B60L 53/80* | (2019.01) |
| *B60L 1/00* | (2006.01) |
| *B60L 50/60* | (2019.01) |
| *B60L 53/66* | (2019.01) |
| *H01M 10/44* | (2006.01) |
| *H01M 10/48* | (2006.01) |
| *H01M 50/249* | (2021.01) |
| *H01M 50/262* | (2021.01) |

(52) U.S. Cl.
CPC ................. *B60L 53/80* (2019.02); *B60L 1/00* (2013.01); *B60L 50/60* (2019.02); *B60L 53/66* (2019.02); *H01M 10/44* (2013.01); *H01M*

*10/488* (2013.01); *H01M 50/249* (2021.01); *H01M 50/262* (2021.01); *H01M 2220/20* (2013.01)

(58) Field of Classification Search
CPC .. B60L 53/80; B60L 53/66; B60K 2001/0472
See application file for complete search history.

(56) References Cited

U.S. PATENT DOCUMENTS

| | | | | |
|---|---|---|---|---|
| 2004/0035617 A1* | 2/2004 | Chaney | .................... | B60K 1/04 |
| | | | | 180/68.5 |
| 2005/0274556 A1* | 12/2005 | Chaney | .................... | B60K 6/28 |
| | | | | 180/68.5 |
| 2012/0217077 A1* | 8/2012 | Ojima | .................... | B60L 50/66 |
| | | | | 180/68.5 |

(Continued)

FOREIGN PATENT DOCUMENTS

| | | |
|---|---|---|
| JP | 2011-131805 A | 7/2011 |
| JP | 2012-192783 A | 10/2012 |

(Continued)

*Primary Examiner* — Brian L Swenson
(74) *Attorney, Agent, or Firm* — Dinsmore & Shohl LLP

(57) ABSTRACT

An electrically powered vehicle includes: a vehicle body including a power converter that operates a motor; and a first battery that is attached in a replaceable manner to the vehicle body and supplies electric power to the power converter. The vehicle body includes a first connector for connecting to the first battery. The first battery includes a second connector to be connected to the first connector. The electrically powered vehicle further includes a lock mechanism that locks connection between the first connector and the second connector when the connection between the first connector and the second connector is completed.

2 Claims, 4 Drawing Sheets

(56)　　　　　References Cited

U.S. PATENT DOCUMENTS

| | | | |
|---|---|---|---|
| 2012/0233850 | A1 | 9/2012 | Hozumi et al. |
| 2012/0247851 | A1* | 10/2012 | Ichikawa ................. B60L 3/04 |
| | | | 180/68.5 |
| 2012/0306445 | A1 | 12/2012 | Park et al. |
| 2014/0250653 | A1* | 9/2014 | Droste ................. H01M 10/44 |
| | | | 29/729 |
| 2015/0063897 | A1* | 3/2015 | Poillot ............... H01M 50/264 |
| | | | 403/20 |
| 2015/0151624 | A1* | 6/2015 | Yamada .................. B60K 1/04 |
| | | | 180/68.5 |
| 2017/0341524 | A1 | 11/2017 | Heiss et al. |
| 2019/0202276 | A1* | 7/2019 | Bengtsson .......... H01M 50/262 |
| 2022/0203860 | A1* | 6/2022 | Zhang ..................... B60L 53/80 |
| 2025/0282226 | A1* | 9/2025 | Kimura .................. B60L 53/80 |

FOREIGN PATENT DOCUMENTS

| | | |
|---|---|---|
| JP | 2012-254012 A | 12/2012 |
| JP | 2017-216870 A | 12/2017 |

\* cited by examiner

ELECTRICALLY POWERED VEHICLE

CROSS-REFERENCE TO RELATED APPLICATIONS

This nonprovisional application is based on Japanese Patent Application No. 2022-194393 filed on Dec. 5, 2022 with the Japan Patent Office, the entire contents of which are hereby incorporated by reference.

BACKGROUND

Field

The present disclosure relates to an electrically powered vehicle.

Description of the Background Art

Japanese Patent Laying-Open No. 2012-192783 discloses a battery replacement apparatus for replacing a battery of an electrically powered vehicle. The battery replacement apparatus removes the battery attached to the electrically powered vehicle and attaches the charged battery to the electrically powered vehicle. Each of the battery removed from the electrically powered vehicle and the charged battery is carried by a battery mounting portion driven below the electrically powered vehicle.

SUMMARY

In order to replace a battery, it is necessary to connect a connector of the battery to a connector on the vehicle body side. The position of the connector of the battery and position of the connector on the vehicle body side relative to each other changes due to vibration during traveling of the electrically powered vehicle, resulting in a possibility that the state of connection between the two connectors becomes defective.

The present disclosure provides an electrically powered vehicle capable of preventing defective connection between a battery connector and a vehicle body connector.

According to an aspect of the present disclosure, an electrically powered vehicle includes: a vehicle body including a power converter that operates a motor; and a first battery that is attached in a replaceable manner to the vehicle body and supplies electric power to the power converter. The vehicle body includes a first connector for connecting to the first battery. The first battery includes a second connector to be connected to the first connector. The electrically powered vehicle further includes a lock mechanism that locks connection between the first connector and the second connector when the connection between the first connector and the second connector is completed.

According to the above-described configuration, the connection between the first connector and the second connector can be locked by the lock mechanism. Therefore, it is possible to prevent a defective connection between the first connector and the second connector.

In some embodiments, the vehicle body further includes an accessory device and a second battery that supplies electric power to the accessory device. The lock mechanism is operated by electric power of the second battery.

According to the above-described configuration, the lock mechanism can be operated by the second battery without power fed from the first battery.

In some embodiments, the vehicle body further includes a control device that controls operation of the lock mechanism. The accessory device is capable of communicating with an external device. The control device causes the lock mechanism to lock the connection between the first connector and the second connector, based on a fact that the accessory device receives, from the external device, a notification indicating that the first battery is replaced with a charged battery.

According to the above-described configuration, the connection between the first connector and the second connector can be locked automatically as triggered by completion of the battery replacement.

In some embodiments, the vehicle body further includes an output device and a sensor that senses locking of the connection. The control device causes the output device to output a predetermined warning, when the locking is not sensed regardless of control performed to cause the connection to be locked.

According to the above-described configuration, the driver of the electrically powered vehicle, for example, can know that the locking is not completed.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
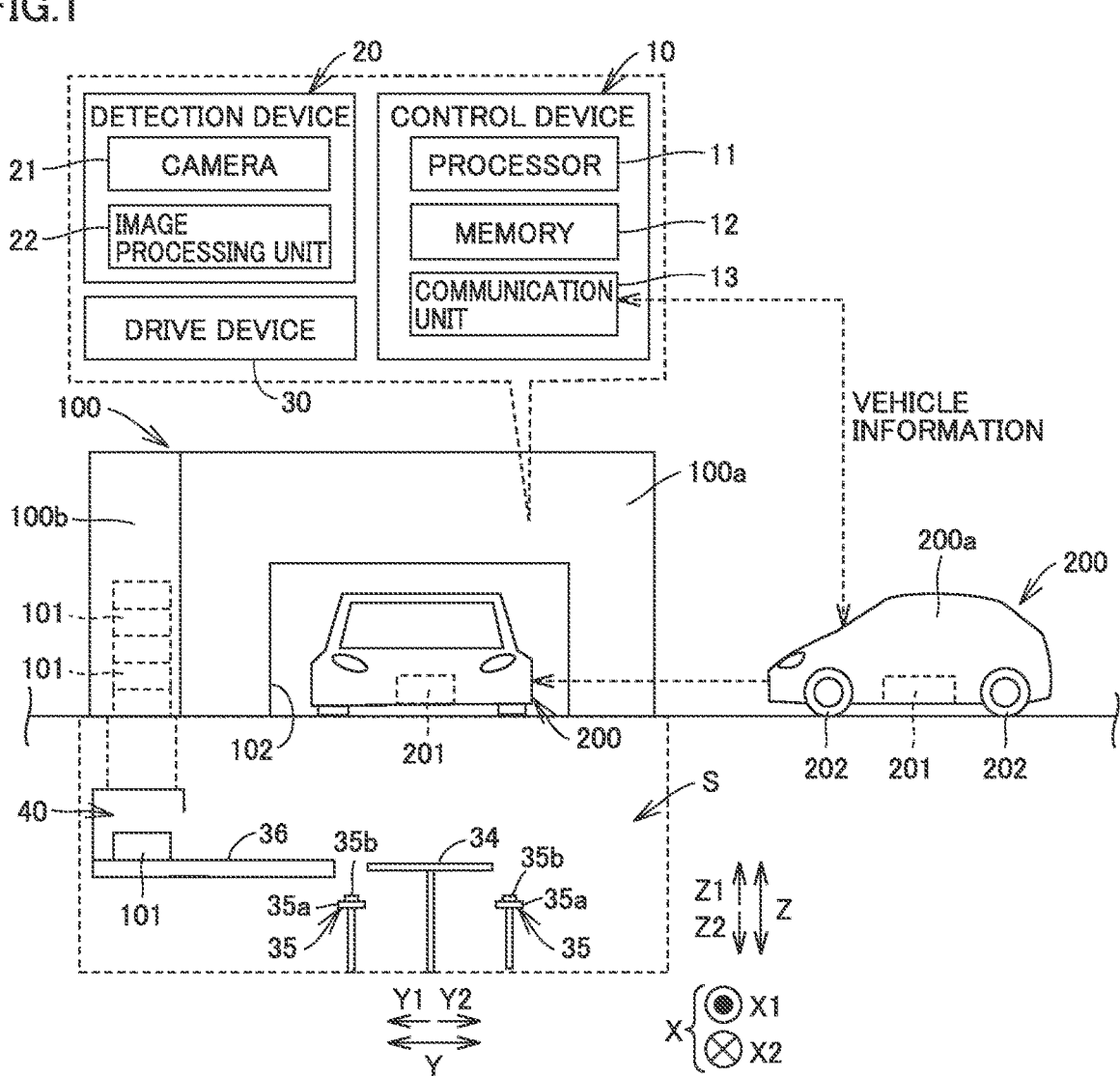
FIG. 1 is a diagram showing a battery replacement apparatus and an electrically powered vehicle.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram showing a battery replacement apparatus 100 and an electrically powered vehicle 200 according to the present embodiment. As shown in FIG. 1, a battery replacement apparatus 100 is an apparatus for replacing a battery 201 attached to a vehicle body 200a of an electrically powered vehicle 200 with a charged battery 101.

The electrically powered vehicle 200 is a hybrid electric vehicle that can travel by using power of at least one of a motor and an engine, or an electrically powered vehicle that travels by a driving force obtained by electric energy. The battery 201 and the battery 101 are rechargeable batteries (secondary batteries) such as ternary lithium ion batteries and iron phosphate lithium ion batteries.

The battery replacement apparatus 100 includes a battery replacement station 100a in which battery replacement is performed, and a storage 100b in which a charged battery 101 is stored. The storage 100b is provided in parallel with the battery replacement station 100a. The battery replacement station 100a is provided with an entrance/exit 102 for the electrically powered vehicle 200 to enter/exit.

After the battery 101 stored in the storage 100b is moved to the temporary placement site 40 provided in the underfloor area S, the battery 101 is conveyed to the electrically powered vehicle 200. The underfloor area S is provided with a battery mounting table 34, a raising/lowering unit 35, and a transport unit 36.

The battery replacement apparatus 100 includes a control device 10, a detection device 20, and a drive device 30. The control device 10 includes a processor 11, a memory 12, and a communication unit 13. The memory 12 stores, in addition to a program executed by the processor 11, information (e.g., map, formula, and various parameters) used by the program. The processor 11 controls the drive device 30.

The communication unit 13 includes various communication I/Fs (Inter Faces). The processor 11 controls the communication unit 13. The communication unit 13 communicates with DCM (Data Communication Module) 241 (see FIG. 4) and the like of the electrically powered vehicle 200. The communication unit 13 and the electrically powered vehicle 200 can perform bidirectional communication. The communication unit 13 may communicate with an information processing apparatus possessed by a user of the electrically powered vehicle 200. Typical examples of the information processing apparatus include terminal apparatuses such as a smartphone, a tablet terminal, and a computer.

The electrically powered vehicle 200 transmits vehicle information about the electrically powered vehicle 200 to the communication unit 13 of the battery replacement apparatus 100. For example, when an operation of transmitting vehicle information is performed in a navigation system (not shown) of the electrically powered vehicle 200, the vehicle information is transmitted to the communication unit 13. The electrically powered vehicle 200 transmits vehicle information before entering the battery replacement apparatus 100. The vehicle information may be transmitted after the electrically powered vehicle 200 enters the battery replacement apparatus 100.

The detection device 20 includes a camera 21 and an image processing unit 22. The detection device 20 detects the position, orientation, and size of the batteries 201 and 101 mounted on the mounting table 34. Specifically, the camera 21 images the battery 101 mounted on the mounting table 34. The image data obtained by the imaging is sent to the image processing unit 22. The image processing unit 22 determines the position, orientation, and size of the batteries 201 and 101 based on the image data. The image processing unit 22 notifies the control device 10 of the determination result.

Figure 2:
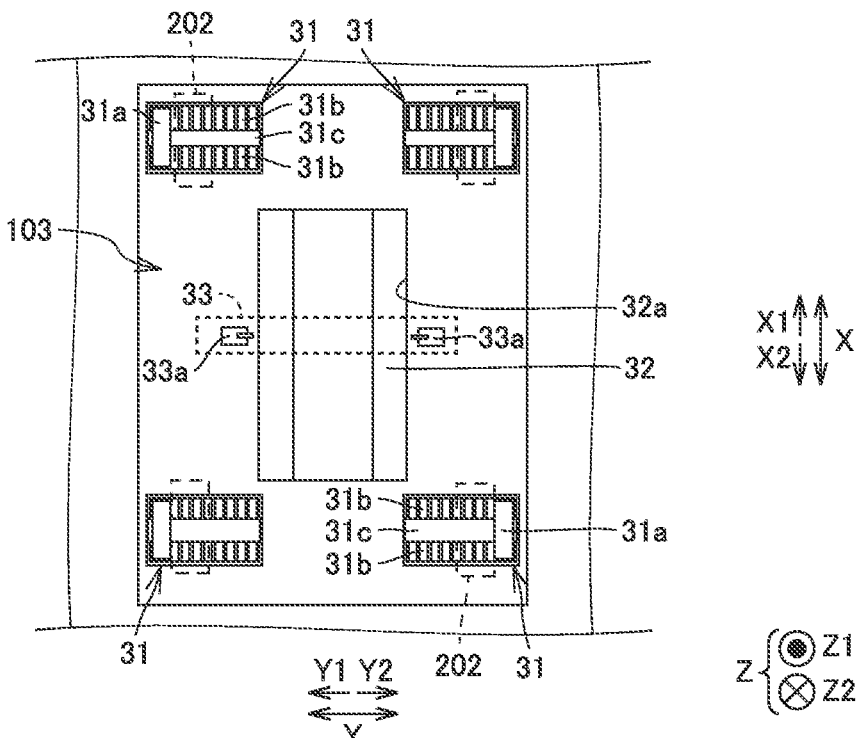
FIG. 2 is a plan view showing a vehicle stop area of the battery replacement apparatus.

FIG. 2 is a plan view showing a vehicle stop area of the battery replacement apparatus 100. As shown in FIG. 2, the battery replacement apparatus 100 is provided with a vehicle stop area 103. In a state in which the electrically powered vehicle 200 is stopped in the vehicle stop area 103, when the user performs an operation for instructing the start of the battery replacement operation in a navigation system (not shown) of the electrically powered vehicle 200, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area 103 such that the front-rear direction is the X direction and the left-right direction is the Y direction.

The drive device 30 (refer to FIG. 1) includes a wheel chock 31, a shutter 32, a cleaning unit 33, a battery mounting table 34 (refer to FIG. 1), a raising/lowering unit 35 (refer to FIG. 1), a transport unit 36 (refer to FIG. 1), an adjustment unit 37 (refer to FIG. 3) and a guide unit (not shown) for guiding the battery 101.

Four wheel chocks 31 are provided in the vehicle stop area 103. The wheel chocks 31 are provided so as to correspond to the four wheels 202 of the electrically powered vehicle 200. The processor 11 adjusts the position of the wheel chock 31 based on the vehicle information acquired through the communication unit 13.

The wheel chock 31 includes a pressing member 31a, a pair of lateral roller portions 31b, and a slider portion 31c. The pressing member 31a is disposed so as to straddle the pair of lateral roller portions 31b and the slider portion 31c. The pressing member 31a moves the wheel 202 by pressing the wheel 202 from the outside (side). As a result, the wheel 202 is positioned by the wheel chock 31.

The lateral roller portion 31b is provided on each of the X1 side and the X2 side of the slider portion 31c. Each of the pair of lateral roller portions 31b includes a plurality of rollers whose rotation axes extend in the X direction. The plurality of rollers of the lateral roller portion 31b are arranged in the Y direction. By the rotation of the plurality of rollers of the lateral roller portion 31b, the pressing member 31a is moved along the Y direction.

The slider portion 31c moves the pressing member 31a placed on the wheel chock 31 along the X direction. The slider portion 31c may be of a belt conveyor type, for example. Note that the configuration of the wheel chock 31 is not limited to the above example. For example, either the lateral roller portion 31b or the slider portion 31c may not be provided.

The processor 11 controls the cleaning unit 33 to clean the battery 201. The cleaning unit 33 includes, for example, two nozzles 33a. The two nozzles 33a are provided so as to sandwich an opening 32a for retracting the battery 201 removed from the electrically powered vehicle 200 in the Y direction. The nozzle 33a discharges water from below the battery 201 toward the battery 201. Thus, the battery 201 is cleaned.

By opening the shutter 32, the opening 32a is exposed. Although FIG. 2 shows an example in which the shutter 32 is open at both sides, the shutter 32 may be open at one side.

Figure 3:
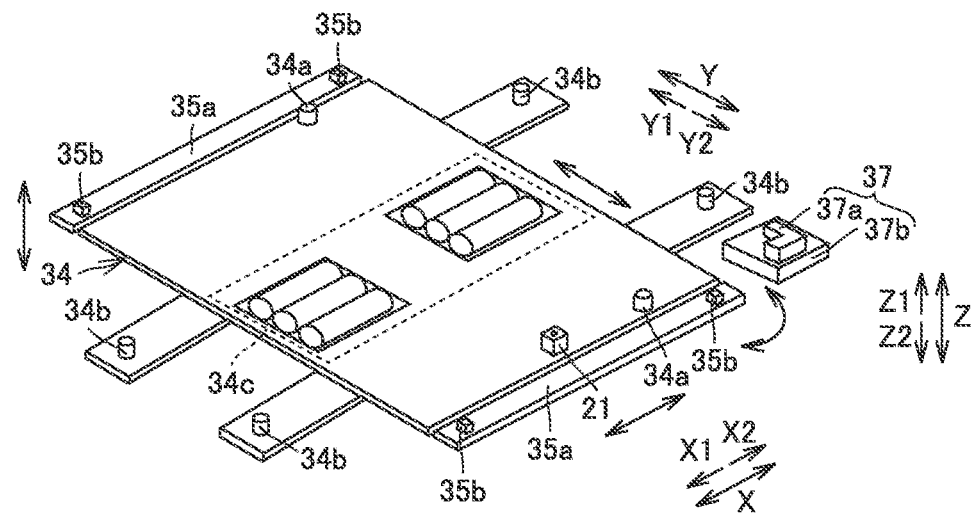
FIG. 3 is a perspective view showing a configuration of a battery mounting table of the battery replacement apparatus.

FIG. 3 is a perspective view showing a configuration of a battery mounting table 34 of the battery replacement apparatus 100. As shown in FIG. 3, the battery mounting table 34 is provided with two positioning pins 34a, four locking/unlocking tools 34b, and a roller portion 34c. The camera 21 is mounted (fixed) on the battery mounting table 34.

The camera 21 is mounted, for example, on an edge portion of the battery mounting table 34 on the Y2 side. The camera 21 may be provided at a position other than the battery mounting table 34 (for example, a raising/lowering bar 35a described later). The camera 21 may be configured to be movable with respect to the battery mounting table 34. A tapered surface is provided at the distal end of the positioning pin 34a. That is, the positioning pin 34a has a tapered shape toward the Z1 side.

In order to attach the battery 101 to the vehicle body 200a, the battery mounting table 34 moves relative to the vehicle body 200a in a state in which the battery 101 is mounted. The battery mounting table 34 is configured to be movable in a horizontal direction below the electrically powered vehicle 200. Specifically, the battery mounting table 34 is movable in the X direction (X1 direction, X2 direction) and the Y direction (Y1 direction, Y2 direction).

Referring again to FIG. 1, the transport unit 36 is configured to be able to transport the batteries (201, 101). Specifically, the transport unit 36 conveys the battery 201, which is detached from the electrically powered vehicle 200 and mounted on the battery mounting table 34, to the temporary placement site 40. When the roller portion 34*c* (see FIG. 3) of the battery mounting table 34 rotates in a state in which the battery mounting table 34 is lowered to the same height position (position in the Z direction) as the transport unit 36, the battery 201 mounted on the battery mounting table 34 is moved to the Y1 side and is mounted on the transport unit 36. The transport unit 36 moves the battery 201 to the temporary placement site 40. The transport unit 36 may be of a belt conveyor type, for example.

The transport unit 36 moves the charged battery 101 transferred from the storage 100*b* to the temporary placement site 40 to the Y2 side and places the battery 101 on the battery mounting table 34. At this time, the roller portion 34*c* of the battery mounting table 34 rotates in the opposite direction to the above, whereby the battery 101 is moved to the Y2 side on the battery mounting table 34.

The raising/lowering unit 35 raises and lowers the electrically powered vehicle 200 by raising/lowering the electrically powered vehicle 200 while holding the electrically powered vehicle 200 from below. The raising/lowering unit 35 is movable in the vertical direction (Z direction) through the opening 32*a* (see FIG. 2). The raising/lowering unit 35 includes a pair of raising/lowering bars 35*a*. Each of the pair of raising/lowering bars 35*a* is provided with two protrusions 35*b* protruding toward the Z1 side. The electrically powered vehicle 200 is supported from below by two protrusions 35*b* (i.e., four protrusions 35*b* (see FIG. 3)) of each of the pair of raising/lowering bars 35*a*. Each of the pair of raising/lowering bars 35*a* may be movable similarly to the battery mounting table 34.

Referring again to FIG. 3, the adjustment unit 37 includes a stopper portion 37*a* and a movable portion 37*b*. The stopper portion 37*a* is disposed (fixed) on the movable portion 37*b*.

The stopper portion 37*a* restricts the movement of the battery 101 mounted on the battery mounting table 34 to each of the X2 side and the Y2 side. The stopper portion 37*a* defines the position in the horizontal direction of the corner portion of the battery 101 mounted on the battery mounting table 34.

The stopper portion 37*a* has an L shape in a top view. The battery 101 has a rectangular shape in a top view. Accordingly, the stopper portion 37*a* contacts a part of the side surface of the battery 101 on the X2 side and a part of the side surface of the battery 101 on the Y2 side.

The adjustment unit 37 is driven independently of the battery mounting table 34. Specifically, the movable portion 37*b* in which the stopper portion 37*a* is disposed is movable in the X direction (X1 direction, X2 direction) and the Y direction (Y1 direction, Y2 direction) independently of the battery mounting table 34.

After the movement of the battery 101 is restricted by the stopper portion 37*a*, the battery mounting table 34 raises the battery 101. Then, the battery 101 is attached to the vehicle body 200*a* of the electrically powered vehicle 200.

Figure 4:
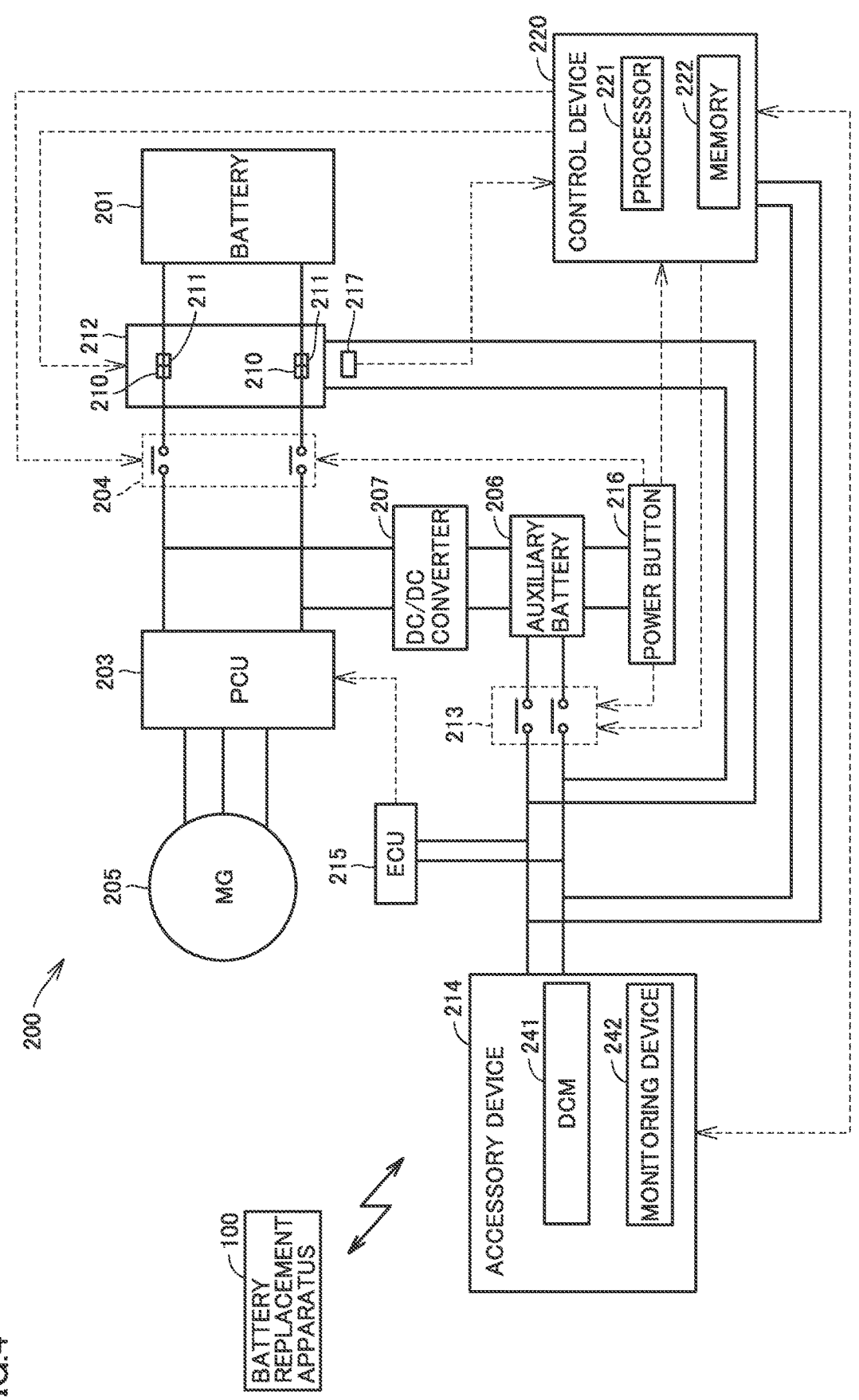
FIG. 4 is a diagram showing a device configuration of the electrically powered vehicle.

FIG. 4 is a diagram showing a device configuration of the electrically powered vehicle 200. As shown in FIG. 4, the electrically powered vehicle 200 includes a battery 201, a power control unit (PCU) 203, a system main relay (SMR) 204, an MG (Motor Generator) 205, an auxiliary battery 206, a DC/DC converter 207, a vehicle side connector (first connector) 210, a connector (second connector) 211 of the battery 201, a lock mechanism 212, an auxiliary relay 213, an accessory device 214, ECU (Electronic Control Unit) 215, a power button 216, a sensor 217, and a control device 220.

The accessory device 214 includes a DCM 241 and a monitor device 242 with a touch panel function. The control device 220 includes a processor 221 and a memory 222. The memory 222 stores a program executed by the processor 221 and information used by the program. The processor 221 controls the operation of each part of the electrically powered vehicle 200.

The battery 201 (battery 101) is an example of the "first battery" of the present disclosure. The auxiliary battery 206 is an example of the "second battery" of the present disclosure. The PCU 203 is an example of the "power converter" of the present disclosure.

The connector 210 is provided in the vehicle body 200*a*. That is, the vehicle body 200*a* includes the connector 210. The connector 210 is fixed to a predetermined position of the vehicle body 200*a*. The connector 210 is for connecting to the battery 201 (or the battery 101).

The connector 211 is provided in the battery 201. That is, the battery 201 includes the connector 211. The connector 211 is provided at a predetermined position in the housing of the battery 201. The connector 211 is for connecting to the connector 210.

A connector 211 is also provided in the battery 101 charged for replacement. The connector 210 and the connector 211 are also referred to as a "PN (Positive Negative) connector". The PN connector is a two-pole connector that connects the positive and negative electrodes of the battery 201 to the PCU 203.

The battery 201 is connected to the PCU 203 and the DC/DC converter 207 via connectors 210 and 211 and a system main relay 204. The PCU 203 is connected to the MG 205 and the ECU 215. The PCU 203 operates a motor (more specifically, the MG 205) by electric power from the battery 201 based on an instruction from the ECU 215. The DC/DC converter 207 is connected to the auxiliary battery 206.

The DC/DC converter 207 is provided to charge the auxiliary battery 206. When the control device 220 drives the DC/DC converter 207, the auxiliary battery 206 is charged by the power of the battery 201.

The auxiliary battery 206 is connected to the lock mechanism 212, the accessory device 214, the ECU 215, and the control device 220 via the auxiliary relay 213. The lock mechanism 212, the accessory device 214, the ECU 215, and the control device 220 operate by the power of the auxiliary battery 206.

The power button 216 is a push button. The power button is also referred to as a "start button", a "power switch" or an "ignition switch".

In this example, when the power button 216 is pressed by the driver while the brake pedal (not shown) is depressed by the driver of the electrically powered vehicle 200, the system main relay 204 and the auxiliary relay 213 are turned on. More specifically, when the power button 216 is pressed, current is supplied from the auxiliary battery 206 to the system main relay 204 and the auxiliary relay 213, and as a result, the system main relay 204 and the auxiliary relay 213 are turned on. After the power button 216 is pressed, the system main relay 204 and the auxiliary relay 213 are kept in a self-holding state (maintained in an on state).

When the system main relay 204 is turned on, power is supplied from the battery 201 to the PCU 203 and the DC/DC converter 207 in the state shown in FIG. 4. When the auxiliary relay 213 is turned on, power is supplied from the auxiliary battery 206 to the lock mechanism 212, the accessory device 214, the ECU 215, and the control device 220. In this example, when the power button 216 is pressed in a state where the brake pedal is not depressed, only the auxiliary relay 213 among the system main relay 204 and the auxiliary relay 213 is turned on.

The lock mechanism 212 locks the connection between the connector 210 and the connector 211 after the connection between the connector 210 and the connector 211 is completed. The lock mechanism 212 operates in response to a command from the control device 220. The lock mechanism 212 performs locking and unlocking according to a command from the control device 220. The term "completion of connection between the connector 210 and the connector 211" typically denotes a state in which the connector 211 on the battery 201 side is inserted (coupled) into the connector 210 on the vehicle body 200a side.

Typically, the lock mechanism 212 restricts the movement of the connectors 210 and 211 so that the connectors 210 and 211 are not separated from each other. For example, the lock mechanism 212 prevents the connectors 210 and 211 from being separated from each other by abutting the connectors 210 and 211 at the time of locking. By applying a force to the connectors 210 and 211 in a direction in which the connectors 210 and 211 engage with each other by the lock mechanism 212, the connectors 210 and 211 may not be separated from each other.

The lock mechanism 212 prevents displacement of the other relative position with respect to one of the connectors 210 and 211. The mechanism for locking the connectors 210 and 211 is not particularly limited.

The sensor 217 detects a locked state of the lock mechanism 212. The sensor 217 detects that the connection between the connector 210 and the connector 211 is locked and that the connection is not locked (the lock is released). The sensor 217 transmits a first signal (e.g., an ON signal) to the control device 220 when the connection between the connector 210 and the connector 211 is locked by the lock mechanism 212. The sensor 217 transmits a second signal (e.g., an OFF signal) to the control device 220 when the lock by the lock mechanism 212 is released.

The control device 220 can determine whether or not the connectors 210 and 211 can be locked by the lock mechanism 212 based on the output of the sensor 217. The control device 220 outputs a predetermined warning to the monitor device 242 when the connection between the connector 210 and the connector 211 is not completed even if the control is performed to lock the connection between the connector 210 and the connector 211. It should be noted that the warning is not limited to display, and may be sound (sounder output) alone, or sound and display.

The system main relay 204 further operates based on a command from the control device 220. The system main relay 204 is turned on and off in response to a command from the control device 220. When the system main relay 204 is turned on, power is supplied from the battery 201 to the PCU 203 and the DC/DC converter 207 as described above. Thus, the battery 201 supplies power to the PCU 203 when the system main relay 204 is in the ON state, and charges the auxiliary battery 206 based on the fact that the DC/DC converter 207 is operated by the control device 220.

Similar to the system main relay 204, the auxiliary relay 213 operates based on a command from the control device

220. The auxiliary relay 213 is turned on and off in response to a command from the control device 220. When the auxiliary relay 213 is turned on, electric power is supplied from the auxiliary battery 206 to the lock mechanism 212, the accessory device 214, the ECU 215, and the control device 220, as described above. Thus, the auxiliary battery 206 supplies power to the lock mechanism 212, the accessory device 214, the ECU 215, and the control device 220 when the auxiliary relay 213 is in the ON state.

The accessory device 214 includes a plurality of devices. The accessory device 214 can communicate with an external device such as the battery converter 100. Specifically, the DCM 241 communicates with an external device.

In the following, a description will be given of processing when the control device 220 receives an instruction (hereinafter, also referred to as a "battery replacement instruction") for replacing the battery 201 with the charged battery 101 by an operator operation on the monitor device 242 by a driver or the like of the electrically powered vehicle 200. In the following description, it is assumed that the system main relay 204 and the auxiliary relay 213 are in an on state when the control device 220 receives a battery replacement instruction from a driver or the like.

When receiving the battery replacement instruction, the control device 220 determines whether or not the battery remaining amount of the auxiliary battery 206 is equal to or greater than a predetermined amount (hereinafter, also referred to as a "threshold value"). When the battery remaining amount is less than the threshold value, the control device 220 operates the DC/DC converter 207 to charge the auxiliary battery 206 with the battery 201. The control device 220 charges the battery 201 until the battery remaining amount of the auxiliary battery 206 becomes equal to or greater than a threshold value.

When the battery remaining amount of the auxiliary battery 206 is equal to or greater than the threshold value, or when the battery remaining amount of the auxiliary battery 206 is equal to or greater than the threshold value due to charging by the battery 201, the control device 220 switches the system main relay 204 from the ON state to the OFF state. In the control device 220, the auxiliary relay 213 maintains the ON state.

After turning off the system main relay 204, the control device 220 controls the lock mechanism 212 to release the lock of the connection between the connector 210 and the connector 211. Thereafter, battery replacement by the battery replacement apparatus 100 is performed.

Specifically, the battery 201 is detached from the vehicle body 200a. Since the auxiliary relay 213 maintains the ON state even when the battery 201 is detached from the vehicle body 200a, the electrically powered vehicle 200 can communicate with an external device such as the battery replacement apparatus 100 by the electric power from the auxiliary battery 206.

Next, the charged battery 101 is attached to the vehicle body 200a. When the battery 101 is attached, the connector 210 and the connector 211 are connected to each other. At this point, the lock by the lock mechanism 212 remains unlocked.

When the mounting of the battery 101 is completed, the battery replacement apparatus 100 transmits a replacement completion notification indicating that the replacement of the battery has been completed to the electrically powered vehicle 200. The electrically powered vehicle 200 receives the replacement completion notification. More specifically, the control device 220 acquires the replacement completion notification via the DCM 241 of the accessory device 214.

Upon receiving the replacement completion notification via the accessory device 214, the control device 220 controls the lock mechanism 212 to lock the connection between the connector 210 and the connector 211. Further, the control device 220 switches the system main relay 204 from the off state to the on state based on the fact that the driver presses the power button 216.

The electrically powered vehicle 200 may include an engine key instead of the power button 216. The engine key may take the key position of LOCK, the key position of ACC, the key position of ON, and the key position of START. When the engine key is moved to the key position of the ACC, only the auxiliary relay 213 among the system main relay 204 and the auxiliary relay 213 is turned on. When the engine key is moved to the key position of the START, the system main relay 204 and the auxiliary relay 213 are turned on.

Figure 5:
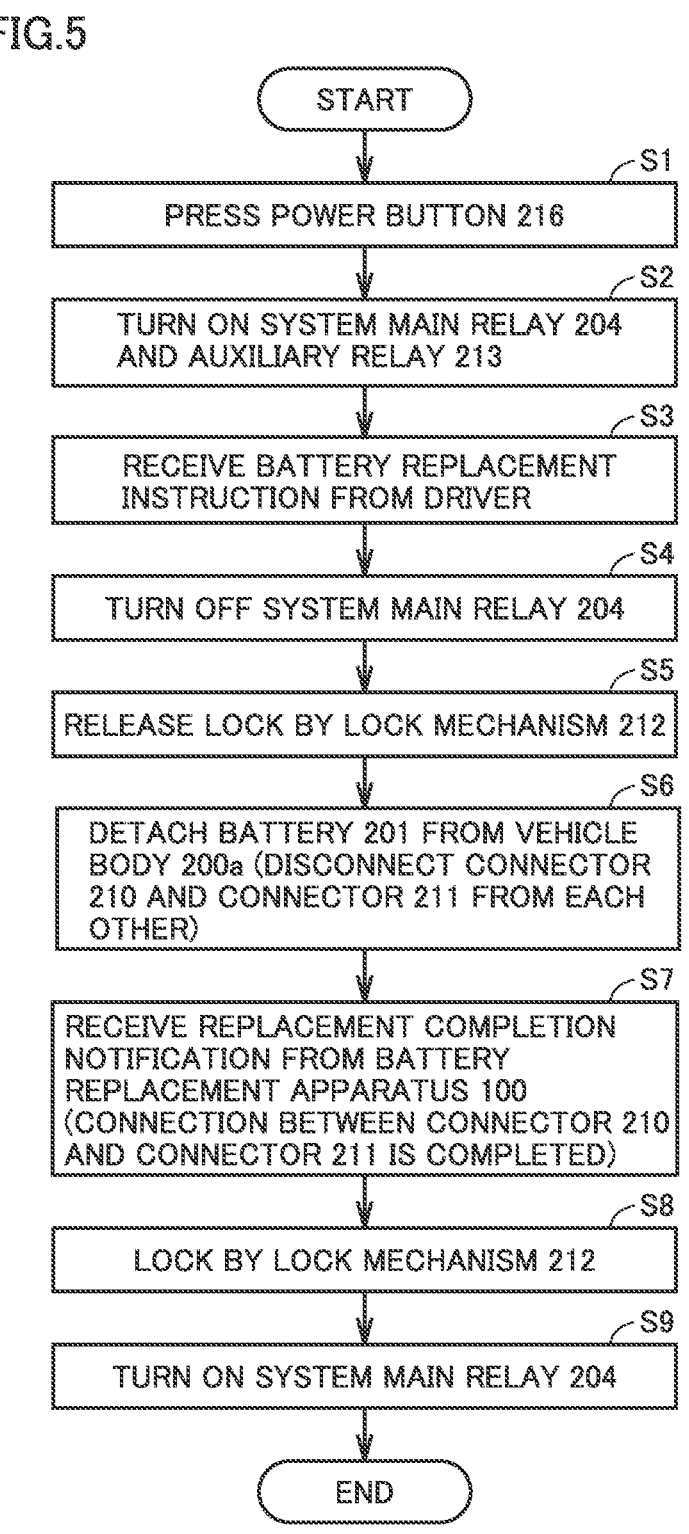
FIG. 5 is a flowchart showing a flow of a part of processing executed in the electrically powered vehicle.

FIG. 5 is a flowchart showing a flow of a part of processing executed in the electrically powered vehicle 200. As shown in FIG. 5, when the power button 216 is pressed in step S1, the system main relay 204 and the auxiliary relay 213 are turned on in step S2.

When the control device 220 receives a battery replacement instruction from the driver in step S3, the control device 220 switches the system main relay 204 from the ON state to the OFF state in step S4.

In step S5, the control device 220 releases the lock by the lock mechanism 212. In step S6, the battery replacement apparatus 100 removes the battery 201 from the vehicle body 200a. Thereby, the connector 210 and the connector 211 are disconnected from each other.

After that, when the electrically powered vehicle 200 receives the replacement completion notification from the battery replacement apparatus 100 in step S7, the control device 220 locks the connection between the connector 210 and the connector 211 by the lock mechanism 212 in step S8. In step S9, the control device 220 switches the system main relay 204 from the off state to the on state. Thus, the series of processing ends.

BRIEF SUMMARY

The following is a brief summary of a part of the configuration of the electrically powered vehicle 200.

(1) The electrically powered vehicle 200 includes a vehicle body 200a including a PCU 203 for operating a motor (MG 205 in this example). The electrically powered vehicle 200 includes a battery 201 which is attached, in a replaceable manner, to a vehicle body 200a and supplies power to a PCU 203. The vehicle body 200a includes a connector 210 for connecting to the battery 201. The battery 201 includes a connector 211 to be connected to a connector 210. The electrically powered vehicle 200 further includes a lock mechanism 212 that locks the connection between the connector 210 and the connector 211 after the connection between the connector 210 and the connector 211 is completed.

According to this configuration, the connection between the connector 210 and the connector 211 can be locked by the lock mechanism 212. Therefore, the relative position between the connector 210 and the connector 211 can be prevented from changing. For example, positional displacement or the like of the connector 210 with respect to the connector 210 can be prevented. Therefore, it is possible to prevent poor connection between the connector 211 of the battery and the connector 210 on the vehicle body side. For example, even if vibration during traveling of the electrically powered vehicle 200 is large, it is possible to prevent the connector 211 of the battery from being detached from the connector 210 on the vehicle body side or to prevent a contact failure between the connectors 211 and 210 (more specifically, a contact failure between the electrodes).

(2) The vehicle body 200a further includes an accessory device 214 and an auxiliary battery 206 for supplying power to the accessory device 214. The lock mechanism 212 is operated by the power of the auxiliary battery 206.

According to this configuration, the lock mechanism 212 can be operated by the auxiliary battery 206 without power fed from the batteries 201 and 101. In this example, the lock mechanism 212 can be operated even when the system main relay 204 is turned off.

(3) The vehicle body 200a further includes a control device 220 that controls the operation of the lock mechanism 212. The accessory device 214 can communicate with an external device such as the battery replacement apparatus 100. The control device 220 causes the lock mechanism 212 to lock the connection between the connector 210 and the connector 211 based on the fact that the accessory device 214 receives a replacement completion notification indicating that the battery 201 has been replaced with the charged battery 101 from the battery replacement apparatus 100.

According to this configuration, the connection between the connector 210 and the connector 211 can be automatically locked by using the completion of the battery replacement as a trigger.

(4) The vehicle body 200a further includes an output device such as a monitor device 242 and a sensor 217 that detects that the connection is locked. The control device 220 causes the output device to output a predetermined warning when the lock is not sensed even when the control for locking the connection is performed.

According to this configuration, the driver or the like of the electrically powered vehicle 200 can know that the lock is not completed.

APPENDIX (1) A control method for controlling an electrically powered vehicle including a battery, wherein
the battery is attached in a replaceable manner to a vehicle body of the electrically powered vehicle and supplies electric power to a power converter that operates a motor, the method comprising:
connecting a first connector of the vehicle body to a second connector of the battery; and
locking connection between the first connector and the second connector after the connection is completed.
(2) A program for causing one or more processors to execute each step of the control method.
(3) A non-transitory computer-readable storage medium having the program stored thereon.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:
1. An electrically powered vehicle comprising:
a vehicle body including a power converter that operates a motor;
a first battery that is attached in a replaceable manner to the vehicle body and supplies electric power to the power converter,

the vehicle body including a first connector for connecting to the first battery, the first battery including a second connector to be connected to the first connector; and a lock mechanism that locks connection between the first connector and the second connector when the connection between the first connector and the second connector is completed, wherein the vehicle body further includes:

an accessory device; and a second battery that supplies electric power to the accessory device, wherein the lock mechanism is operated by electric power of the second battery, wherein the vehicle body further includes a control device that controls operation of the lock mechanism, wherein the accessory device is capable of communicating with an external device, and

wherein the control device causes the lock mechanism to lock the connection between the first connector and the second connector, based on a fact that the accessory device receives, from the external device, a notification indicating that the first battery is replaced with a charged battery.

2. The electrically powered vehicle according to claim 1, wherein the vehicle body further includes;

an output device; and a sensor that senses locking of the connection, and the control device causes the output device to output a predetermined warning, when the locking is not sensed regardless of control performed to cause the connection to be locked.

* * * * *